(Specimens.)

B. RICE.
BEER CHIP.

No. 305,227. Patented Sept. 16, 1884.

WITNESSES:
Chas. Nida.
Jno. A. Bruns.

INVENTOR
Bernard Rice.
BY
ATTORNEY

UNITED STATES PATENT OFFICE.

BERNARD RICE, OF BROOKLYN, NEW YORK.

BEER-CHIP.

SPECIFICATION forming part of Letters Patent No. 305,227, dated September 16, 1884.

Application filed April 16, 1883. (Specimens.)

*To all whom it may concern:*

Be it known that I, BERNARD RICE, of the city of Brooklyn, county of Kings, State of New York, have invented a new and useful Improvement in Beer-Chips; and I do hereby declare the following to be a full, clear, and exact description of the same, reference being had to the accompanying sheet of drawings, forming part of this application.

This invention has for its object to produce a beer-chip which is free from resinous and other similar matters; and to this end it consists in making the chip from a sheet or strip of veneer cut from a log, beam, or plank previously steamed, as herein more fully described.

Figure 1:
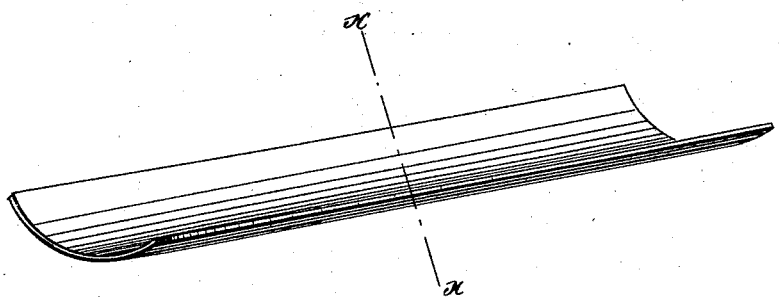
Figure 2:

In the accompanying sheet of drawings, Figure 1 is my beer-chip in perspective. Fig. 2 is a cross-section of the same.

It is well known that for the purpose of clarifying beer in vats or tuns, previous to kegging it, chips of suitable wood are employed. These chips are usually shavings or flat strips made from beech, birch, maple, and other woods adapted to the purpose. The function of these chips is to act mechanically as nuclei, around which gather and adhere the yeasty and other impurities that may be contained in the beer. That these chips of wood may with greater efficacy perform this function, it is important that they should not remain on the surface of the beer alone, nor at the bottom of the vat, since the impurities referred to exist throughout the entire body of the beer in a state of suspension, so that if the chips should remain only on the surface or at the bottom of the beer they would attract only such impurities as the beer contained in their immediate vicinity. Therefore it is necessary that the clarifying-chips should remain in a state of suspension throughout the beer, so that they may catch all, or substantially all, of the impurities contained in it. Now, the chips that have heretofore been used for this purpose, whether as shavings or strips of wood, have been formed by the ordinary process of shaving them off the natural unsteamed wood, or by sawing it, and the result has been that the pores or capillaries of the wood remain somewhat condensed in the process of manufacturing such chips; and, besides, the pores or capillaries have retained the natural resin and mucilage, which, to some extent, fills them, and are so injurious to the flavor of the beer. The result is, in use it is found that these sawed and shaved chips will not readily or fully absorb the beer in which they are placed, and would therefore tend either to pack at the bottom, to float, or remain to a greater or less extent at or upon the surface of the beer. Then, again, the shaved chips, by reason of their brittle character, will not stand the washing process after use to render them fitted for further employment as clarifiers. To meet these several objections, found to exist in such shaved and sawed chips, I form my chips from sheets or strips of veneers sliced or cut, preferably rotary cut, from a log or plank which has been subjected to a steaming process. This steaming process drives out from the capillaries of the wood the resin and mucilage in them, and also the albuminoids, so injurious to the flavor of the beer, and enables these capillaries to become filled with the beer when the chips are immersed in it, and therefore permits the chips to have a specific gravity not differing much from the specific gravity of the beer itself. The result is that when these chips are immersed in the beer they speedily absorb it, and their gravity then permits them to remain in a state of suspension throughout the entire body of the beer.

Another advantage found to exist in my steamed veneer chips is their suppleness—that is, they are less brittle, and will withstand the washing process without breaking or splintering. Their efficiency when made of the rotary-cut veneer is increased by the fact that they are somewhat trough-shaped in form, or have a curved cross-section, as shown in Fig. 2. The advantage of this curvature is to prevent the chips from packing or adhering closely to one another, and thereby interfering with their usefulness, the curvature of the chip effectually preventing this, since the surface of no two chips could be sufficiently parallel to cause them to pack together.

Another advantage in my veneer beer-chip consists in the fact that it can be produced at a greatly-reduced cost; and, further, that while a sawed or shaved chip, to retain any strength at all, has to be of sufficient thickness, my chip, made of veneer wood, can be made very thin and light without impairing its strength or usefulness, thus insuring considerable additional saving in the cost of transportation.

I lay no claim upon the process of preparing the wood or cutting the same into strips or veneers; but What I do claim as my invention, and desire to secure by Letters Patent, is—

As an improved article of manufacture, the herein-described steamed beer-chip, consisting of a thin strip of veneer having the axis of curvature parallel to the grain of the wood, substantially as and for the purpose specified.

BERNARD RICE.

Witnesses:
G. M. PLYMPTON,
JNO. A. BRUNS.